(12) United States Patent
Johnson

(10) Patent No.: US 11,596,131 B1
(45) Date of Patent: Mar. 7, 2023

(54) APPARATUS AND METHOD FOR VAPORIZING OXALIC ACID CRYSTALS TO GENERATE OXALIC ACID GAS TO TREAT BEE MITES

(71) Applicant: UHB, LLC, Wasco, CA (US)

(72) Inventor: Craig Johnson, Bakersfield, CA (US)

(73) Assignee: UHB, LLC, Wasco, CA (US)

( * ) Notice: Subject to any disclaimer, the term of this patent is extended or adjusted under 35 U.S.C. 154(b) by 849 days.

(21) Appl. No.: 16/546,692

(22) Filed: Aug. 21, 2019

(51) Int. Cl.
- A24F 13/00 (2006.01)
- A01K 51/00 (2006.01)
- H05B 3/06 (2006.01)
- H05B 1/02 (2006.01)

(52) U.S. Cl.
CPC ........... *A01K 51/00* (2013.01); *H05B 1/0297* (2013.01); *H05B 3/06* (2013.01)

(58) Field of Classification Search
CPC ....................................................... A24F 47/00
USPC ................................................. 131/328–329
See application file for complete search history.

(56) References Cited

U.S. PATENT DOCUMENTS

| 5,449,390 | A | * | 9/1995 | Duncan | B03C 3/013 |
| | | | | | 261/DIG. 75 |
| 6,368,389 | B1 | * | 4/2002 | Birke | C07C 51/43 |
| | | | | | 55/474 |
| 7,578,722 | B1 | | 8/2009 | Baumgartner | |
| 8,948,577 | B2 | | 2/2015 | Eberli et al. | |
| 2018/0263222 | A1 | | 9/2018 | Oster | |
| 2018/0317458 | A1 | | 11/2018 | Puzankov et al. | |
| 2019/0141980 | A1 | | 5/2019 | Martens et al. | |

\* cited by examiner

*Primary Examiner* — Phuong K Dinh
(74) *Attorney, Agent, or Firm* — James M. Duncan; Scanlon Duncan LLP

(57) ABSTRACT

An oxalic acid vaporizer has a modular configuration, having a dispensing module and a manually detachable heating module. This modular configuration allows the first heating module to be easily separated from the dispensing module and a substitute heating module attached to the dispensing module, thereby allowing for a very fast replacement of the heating module in the event there is a failure or overheating in the first heating module. The substitute heating module may be a duplicate of the first heating module or the substitute heating module may have a more powerful fan, be capable of greater heat, or it may be of the type having a proportional-integral-derivative controller for controlling temperature. The modular configuration provides for a continuous oxalic acid gas treatment of bee hives by allowing an operator to change out heating modules in a matter of seconds.

18 Claims, 4 Drawing Sheets

APPARATUS AND METHOD FOR VAPORIZING OXALIC ACID CRYSTALS TO GENERATE OXALIC ACID GAS TO TREAT BEE MITES

BACKGROUND OF THE INVENTION

*Varroa* mites have been blamed for "colony collapse disorder" which has caused the decimation of honey bee hives around the world. Upon infiltrating a bee colony, *Varroa* mites (or simply "bee mites") feed off the bodily fluids of adult, pupal and larval honey bees, and spread diseases they carry.

One widely utilized treatment for killing bee mites is to apply oxalic acid to the hive when the hive is broodless. If applied correctly, oxalic acid provides an effective solution to the bee mite problem. However, although oxalic acid is deadly to the mites if applied correctly, it is often applied in quantities and/or intervals too low to be effective, or so high that it harms the bees as well as the mites.

A variety of ways have been utilized to apply oxalic acid to bee hives, including trickling oxalic acid syrup into the spaces between the frames, spraying liquid oxalic acid or heating oxalic acid crystals and applying the vapor to the hives. This last method, if done correctly, can be highly effective in treating bee mites. However, the vaporizing process can be labor intensive and interruptions in the vaporizing process can result in ineffective treatments.

SUMMARY OF THE INVENTION

Embodiments of the present invention provide an apparatus and a method for vaporizing oxalic acid crystals and dispensing a gas generated by the vaporized crystals. Embodiments of the apparatus of the invention have two separate and manually detachable modules—a dispensing module and a heating module. This modular configuration allows a first heating module to be easily separated from the dispensing module and a substitute heating module attached to the dispensing module. This feature allows a very fast replacement of the heating module in the event there is a failure, such as overheating in the first heating module. The substitute heating module may be a duplicate of the first heating module. Alternatively, the substitute heating module may have a more powerful fan, be capable of greater heat, or it may be of the type having a proportional-integral-derivative controller ("PID") for controlling temperature. The modular configuration provides for a continuous oxalic acid gas treatment of bee hives by allowing an operator to change out heating modules in a matter of seconds.

The dispensing module has a chamber for containing the oxalic acid crystals. The chamber has an internal wall. An outwardly extending conduit member and an outwardly extending adapter member are each attached to the chamber. The conduit member has a first end sealingly connected to a first opening in the internal wall. The outwardly extending conduit member may also have a second end, with the second end having a nozzle. The outwardly extending conduit member will typically be positioned at the front facing side of the chamber.

The outwardly extending adapter member is typically positioned at the rear facing side of the chamber. The outwardly extending adapter has a proximal end and a distal end, with the proximal end sealingly connected to a second opening in the internal wall of the chamber. An aperture extends from the proximal end to the distal end.

A manually detachable heating module has an outlet end adapted to slidingly engage the outwardly extending adapter member. Typically, the outlet end of the manually detachable heating module has an inside diameter sufficiently large to receive the distal end of the outwardly extending adapter, with an interference fit between the inside surface of the tube of the outlet end and the outside surface of the distal end of the outwardly extending adapter acting to secure the detachable heating module to the dispensing module. However, as will be appreciated by those skilled in the art, the distal end of outwardly extending adapter may have an inside diameter large enough to receive the outlet end of the manually detachable heating module. Moreover, other manually operable mechanisms aside from an interference fit may be utilized to secure the heating module to the dispensing module, such as latches, J-slots, threads, and similar mechanisms.

The manually detachable heating module may have an air receiving inlet which allows intake of atmospheric air. Alternatively, a pressurized air hose may be attached to the air receiving inlet. The manually detachable heating module may further comprise a heating coil which provides heat to air flowing from the air receiving inlet to the outlet end of the heating module. This heated air passes through the aperture of the outwardly extending adapter member into the chamber, thereby providing heat to the oxalic acid crystals.

A screen member may be disposed within the chamber, with at least a portion of the screen covering the opening to which the proximal end of the outwardly extending adapter is connected. The screen member has perforations which are sized to maintain the oxalic acid crystals behind the screen in crystalline form.

The outwardly extending conduit member and the outwardly extending adapter member will typically not be in axial alignment with each other. Moreover, with respect to the ground surface, the outwardly extending conduit member and the opening to which it is connected will be positioned higher with respect to the ground surface than the outwardly extending adapter member and the opening to which it is connected.

A handle member may be attached to the chamber to facilitate the positioning of the nozzle next to a slot in the bee hive. The nozzle may have a sealing member extending about the nozzle, where the sealing member blocks vaporized oxalic acid from escaping from the hive through the slot to which the nozzle is applying the vapor.

The manually detachable heating module may have an internal fan for creating a positive pressure directed toward the dispensing module. Alternatively, a separate air hose connected to a compressor or pressurized tank may be utilized to provide the positive pressure.

The manually detachable heating module may comprise a controller which maintains a constant temperature of the air flowing to the outlet end of the heating module. This feature allows for a predictable sublimation of the oxalic acid crystals.

The inventor herein has found that various devices utilized as plastic welders provide good service as manually detachable heating modules. For example, an acceptable device is available through Leister Technologies AG, such as that described in U.S. Pat. No. 8,948,577. However, other devices may be utilized as well, including heat guns, paint dryers, hair dryers and other devices capable of providing a heating air stream. These devices may have a built-in proportional-integral-derivative temperature controller The dispensing module, screen, cap, sealing member, and other components exposed to the oxalic acid vapor should be fabricated from materials which are not susceptible from corrosion from oxalic acid. Stainless steel, titanium, Hastelloy, and/or ceramic materials are acceptable for this service, but aluminum and copper can be degraded by oxalic acid when used in high temperature service.

DETAILED DESCRIPTION OF THE INVENTION

Figure 1:
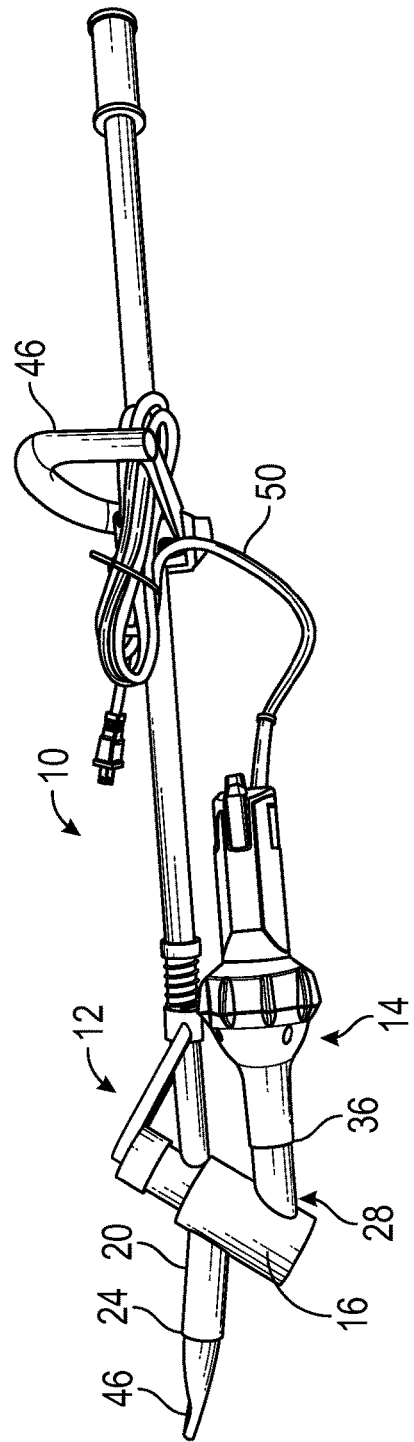
FIG. 1 depicts a side view of an embodiment of the presently disclosed oxalic acid vaporizer.
Figure 2:
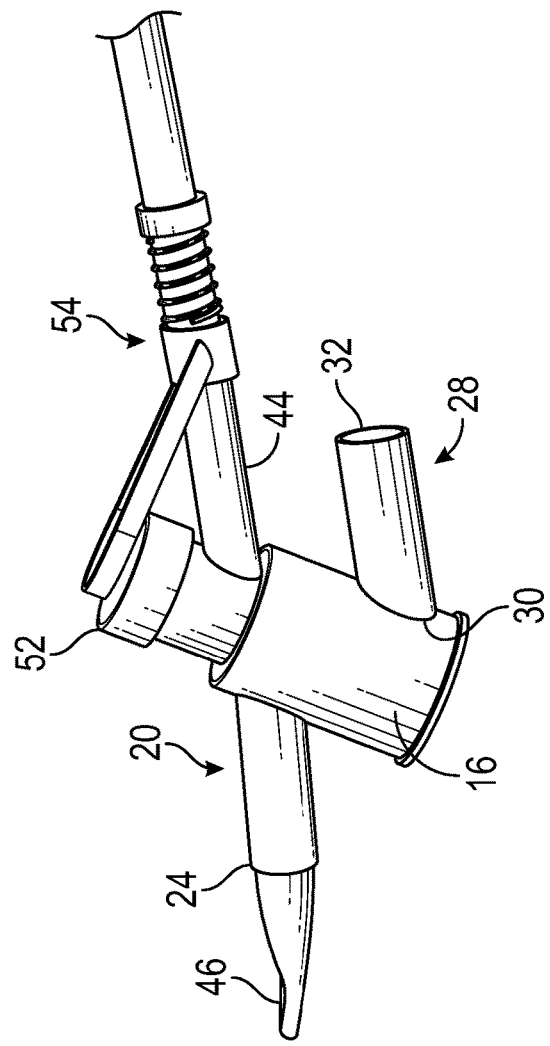
FIG. 2 depicts an embodiment of a dispensing module of the present invention.
Figure 5:
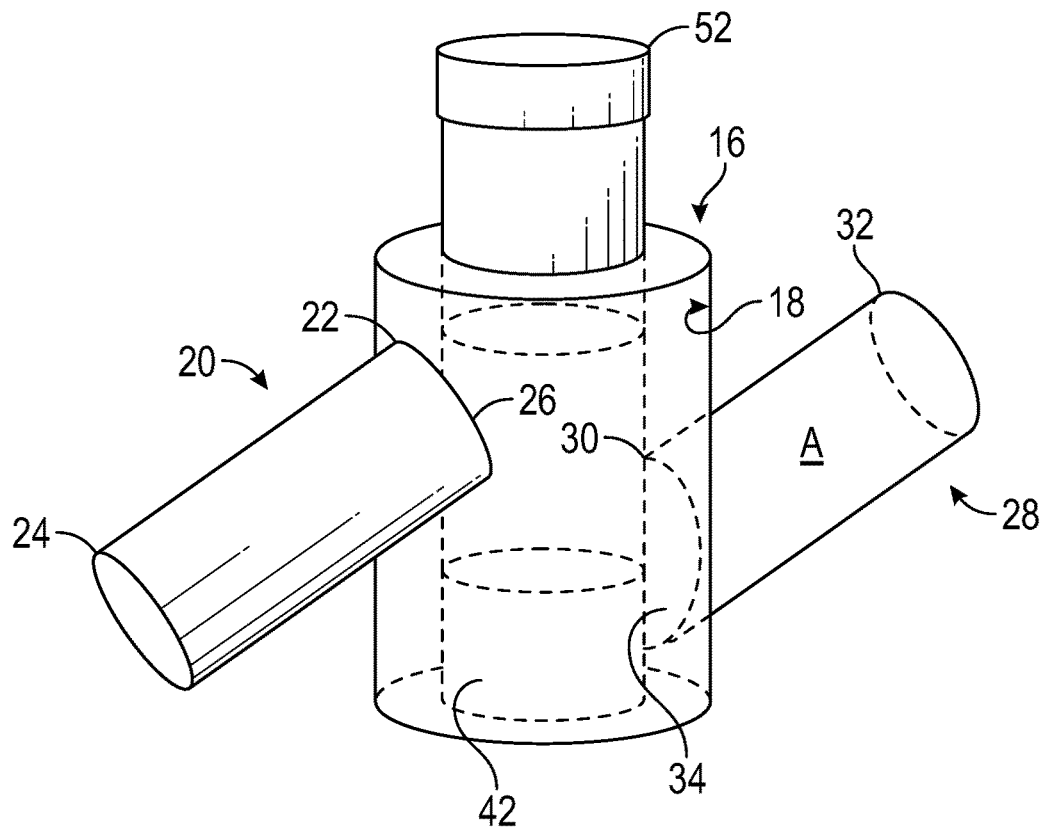
FIG. 5 depicts the chamber, outwardly extending conduit member, and outwardly extending adapter member of an embodiment of a dispensing module.
Figure 6:
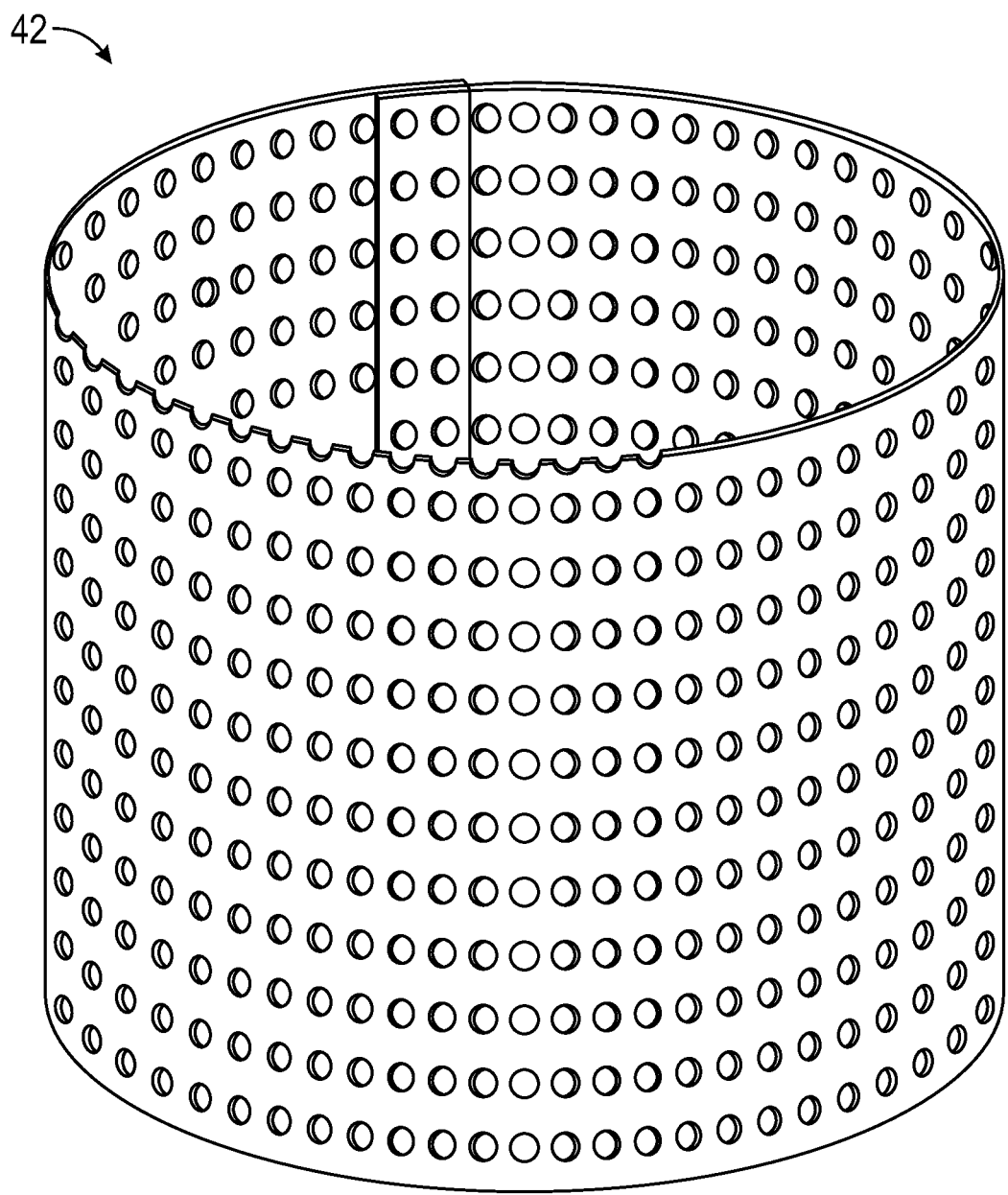
FIG. 6 shows a close-up view of a screen utilized in embodiments of the invention.

Referring now to the Figures, FIG. 1 depicts an embodiment of the disclosed oxalic acid vaporizer 10. The oxalic acid vaporizer has a dispensing module 12 and a detachable heating module 14. Dispensing module 12 has a chamber 16 into which oxalic acid crystals are placed. As depicted in greater detail in FIG. 5, chamber 16, which may be cylindrical in shape, has a wall 18. An outwardly extending conduit member 20 is attached to chamber 16. Outwardly extending conduit member 20 has a first end 22 and a second end 24. Distal end 22 is connected to first opening 26 in the wall 18 by an air-tight sealing process, such as welding, threading, brazing or other sealing processes known in the art. Dispensing module 12 also has an outwardly extending adapter member 28. Outwardly extending adapter member 28 has a proximal end 30 and a distal end 32. Proximal end 30 is attached to a second opening 34 in wall 18 by an air-tight sealing process similar to the process utilized to connect first end 22 to first opening 26. An aperture A extends from proximal end 30 through to distal end 32. As indicated in FIG. 5, first opening 26 may be set at a higher position on chamber 16 from second opening 34. In addition, as shown in FIG. 5, outwardly extending conduit member 20 and outwardly extending adapter member 28 may be attached to chamber 16 such that the members are not in axial alignment. Moreover, outwardly extending conduit member 20 and outwardly extending adapter member may be attached at an angle of approximately 30 degrees from horizontal with respect to a chamber 16 oriented in a vertical position, as indicated in FIG. 5.

Figure 3:
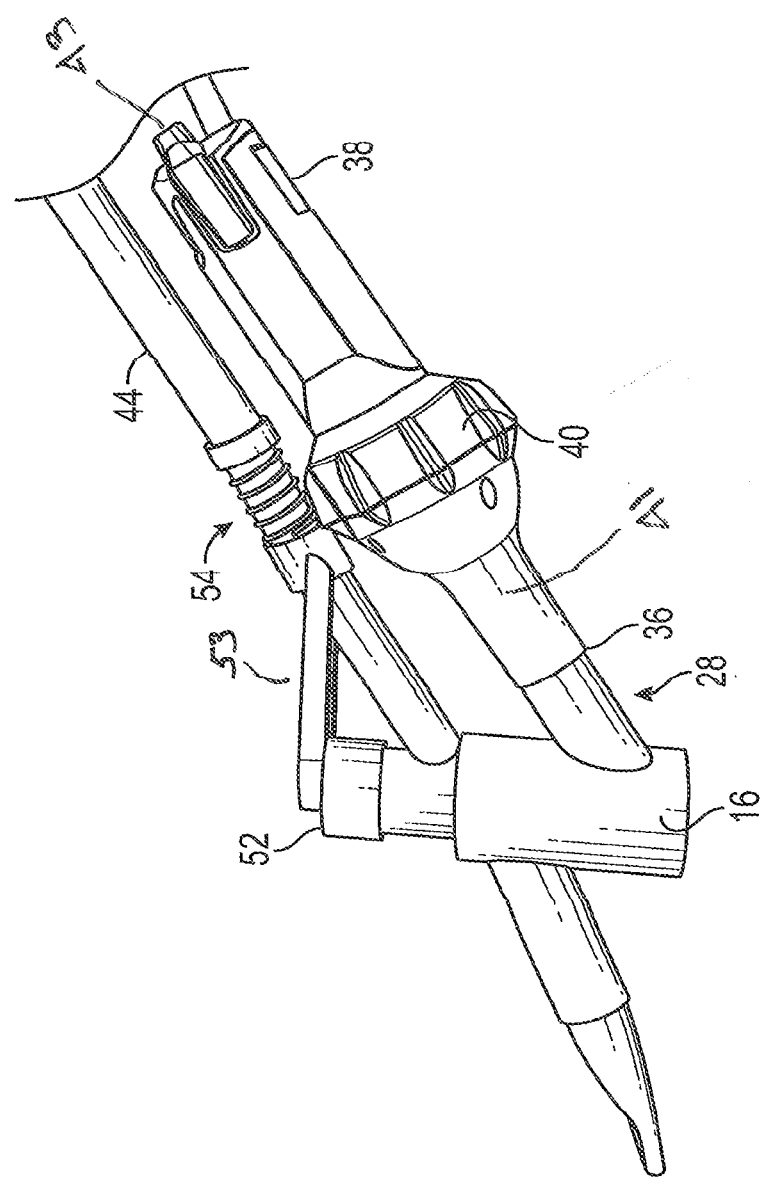
FIG. 3 depicts a close-up view of a detachable heating module attached to a dispensing module of the present invention.
Figure 4:
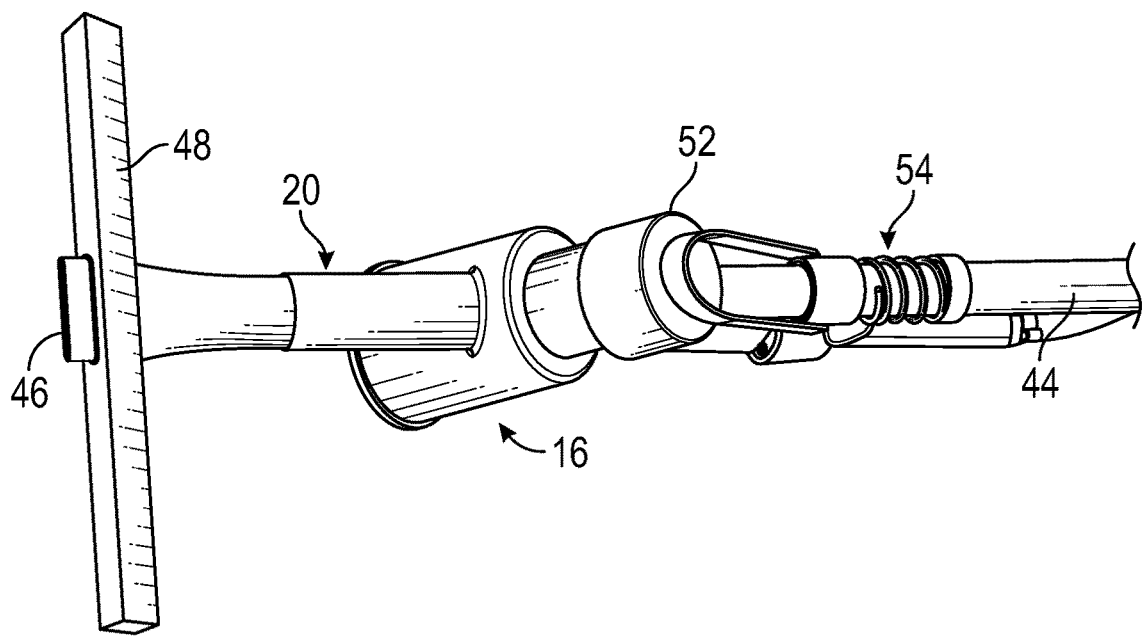
FIG. 4 depicts an embodiment of the dispensing module of the present invention having a sealing member configured around the nozzle.

Manually detachable heating module 14 has an outlet end 36 which is configured to slidingly engage distal end 32 of the outwardly extending adapter member 28. Manually detachable heating module 14 also has an air receiving inlet 38 as shown in FIG. 3. Manually detachable heating module may comprise a fan housing 40 which contains an electric motor with an internal fan which provides air flow from air receiving inlet 38 through to outlet end 36. While the air receiving inlet 38 depicted in FIG. 3 shows an opening in housing 40, it is to be appreciated that in place of a fan contained within fan housing 40, a pressure hose may also be attached to a detachable heating module 14 to provide air flow through the detachable heating module. Air flow from the manually detachable heating module 14 flows through the outlet end 36, through the aperture A of the outwardly extending adapter member 28 into the chamber 16 for heating oxalic acid crystals contained in the chamber. Manually detachable heating module further comprises a heating element 41 typically located downstream of the fan. The heating element 41 provides heat to air flowing from the air receiving inlet 38 to the outlet end 36. The manually detachable heating module 14 may further comprise controls 43 for setting a fixed temperature of the air flowing through to the outlet end 36. As discussed above, an acceptable manually detachable heating module having the configuration discussed above is disclosed in U.S. Pat. No. 8,948,577 and available through Leister Technologies AG. The various electronic components of the oxalic acid vaporizer, including the fan motor, heating element, controls, etc., may receive electrical; current via power cord 50.

Embodiments of the oxalic acid vaporizer may utilize a perforated screen 42 to contain oxalic acid crystals within chamber 16. As indicated in FIG. 5, perforated screen 42 at least partially covers second opening 34.

A handle member 44 may be attached to chamber 16. Handle member 44 may be configured to facilitate placing the second end 24 of outwardly extending conduit 20 adjacent to the openings of a bee hive for application of the oxalic acid vapor. Handle member 44 may comprise a grip 56 to further facilitate placing the vaporized oxalic acid. A nozzle 46 may be attached to second end 24 of extending conduit member 20 to direct the vaporized oxalic acid vapor into the bee hive. A sealing member 48 may be placed about nozzle 46. Sealing member 48 seals against a slot in a bee hive to prevent escape of the oxalic acid vapor from the beehive through the slot.

Chamber 16 may have an upper opening which is sealed by manually detachable cap Manually detachable cap 52 is removed to place oxalic acid crystals inside chamber 16. Manually detachable cap 52 may be configured to allow rapid access to the inside of the chamber 16 to either insert oxalic acid crystals or to check the remaining volume of crystals. A handle member 44 may be attached to the chamber 16 and a bracket member 53 may be used to attach manually detachable cap 52 to handle member 44. A biasing apparatus 54 as shown in the figures may be utilized to bias cap 52 closed against the opening.

A method for vaporizing oxalic acid crystals utilizes embodiments of the apparatus disclosed above. In general, the method includes the steps of placing oxalic acid crystals in a chamber 16 of a dispensing module 12, where the chamber has a wall 18 and a first opening dispensing module has an outwardly extending adapter member 28 having a proximal end 30 and a distal end 32, and an aperture A extends through the outwardly extending adapter member from the proximal end to the distal end. The outlet end 36 of a manually detachable heating module 14 is connected to the distal end 32 of the outwardly extending adapter member 28, where the manually detachable heating module has an air receiving inlet 38 and a heating element which heats air flowing from the air receiving inlet to the outlet end 36 and through aperture A into chamber 16. The heating coil is activated to heat air flowing into chamber 16 thereby heating the oxalic crystals until the crystals sublimate into a gas which flows out of a first opening 26. An outwardly extending conduit member 20 may have a first end 22 connected to the first opening 26 and a second end 24 to which a nozzle 46 is attached.

Having thus described the preferred embodiment of the invention, what is claimed as new and desired to be protected by Letters Patent includes the following:

1. An apparatus for vaporizing oxalic acid crystals and dispensing a gas generated from said vaporizing, the apparatus comprising:
   a dispensing module comprising a chamber for containing oxalic acid crystals, the chamber having a wall, an outwardly extending conduit member attached to the chamber, and an outwardly extending adapter member attached to the chamber, wherein the conduit member has a first end sealingly connected to a first opening in the wall, the outwardly extending conduit member further comprising a second end, the second end comprising a nozzle, and wherein the outwardly extending adapter member has a proximal end sealingly connected to a second opening in the wall, the outwardly extending adapter member comprising a distal end, the outwardly extending adapter member having an aperture extending from the proximal end to the distal end; and
   a manually detachable heating module comprising an outlet end adapted to slidingly engage the outwardly extending adapter member, the manually detachable heating module comprising an air receiving inlet, the manually detachable heating module further comprising a heating element which provides heat to air flowing from the air receiving inlet to the outlet end through the aperture of the outwardly extending adapter member into the chamber.

2. The apparatus of claim 1 wherein the dispensing module further comprises a screen member disposed within the chamber, the screen member at least partially covering the second opening.

3. The apparatus of claim 1 wherein the first opening is set a position higher on the chamber than the second opening.

4. The apparatus of claim 1 further comprising a handle member attached to the chamber.

5. The apparatus of claim 1 wherein the manually detachable heating module comprises a control for setting a fixed temperature of the air flowing to the outlet end.

6. The apparatus of claim 1 wherein the manually detachable heating module comprises a fan which drives air flowing to the outlet end.

7. The apparatus of claim 1 wherein the chamber comprises a manually detachable cap adapted to seal the chamber.

8. The apparatus of claim 7 comprising a handle member attached to the chamber, wherein the manually detachable cap is attached to a bracket member attached to the handle member.

9. The apparatus of claim 8 wherein the manually detachable cap is biased closed against the chamber.

10. The apparatus of claim 1 wherein the second end of the conduit member comprises a sealing member extending about the nozzle.

11. A method for vaporizing oxalic acid crystal comprising the following steps:
    placing oxalic crystals in a chamber of a dispensing module, the chamber having a wall and a first opening through the wall, the dispensing module further comprising an outwardly extending adapter member having a proximal end sealingly attached to a second opening, wherein the outwardly extending adapter member further comprises a distal end and the outwardly extending adapter member has and an aperture extending from the proximal end to the distal end;
    connecting an outlet end of a manually detachable heating module to the distal end of the outwardly extending adapter member, the manually detachable heating module comprising an air receiving inlet and a heating element which heats air flowing from the air receiving inlet to the outlet end and through the aperture to the chamber; and
    activating the heating coil to heat the air flowing from the air receiving inlet to the outlet end and through the aperture to the chamber thereby heating the oxalic crystals until the oxalic crystals sublimate into a gas which flows out of the first opening.

12. The method of claim 11 further comprising an outwardly extending conduit member having a first end connected to the first opening.

13. The method of claim 12 wherein the outwardly extending conduit member comprises a second end, the second end comprising a nozzle.

14. The method of claim 11 wherein a screen member is disposed in the chamber.

15. The method of claim 11 further comprising a handle member attached to the dispensing module.

16. The method of claim 11 wherein the manually detachable heating module comprises a control for setting a fixed temperature of the air flowing to the outlet end.

17. The method of claim 11 wherein the manually detachable heating module comprises a fan which drives air flowing to the outlet end.

18. An apparatus for vaporizing oxalic acid crystals and dispensing a gas generated from said vaporizing, the apparatus comprising:
    a dispensing module comprising a cylindrical chamber having an wall and a circular top, the dispensing module further comprising an outwardly extending conduit member attached to a front side of the cylindrical chamber, and an outwardly extending adapter member attached to a rear side of the cylindrical chamber, wherein a first end of the conduit member is attached to a first opening through the wall, the outwardly extending conduit member further comprising a second end, the second end comprising a nozzle, wherein the outwardly extending adapter member has a proximal end attached to a second opening through the wall, the outwardly extending adapter member comprising a distal end, the outwardly extending adapter member having an aperture extending from the from the proximal end to the distal end, the dispensing module further comprises a screen member disposed against the wall, the screen member at least partially covering the second opening:
    a manually detachable heating module comprising an outlet end configured to slidingly engage the outwardly extending adapter member, the plastic welder comprising an air receiving inlet and a heating element which heats air flowing from the air receiving inlet to the outlet end; and
    a handle member having a first end attached to the cylindrical chamber, the handle member comprising a supporting grip member.

\* \* \* \* \*